United States Patent [19]
Fukushima

[11] Patent Number: 5,940,836
[45] Date of Patent: Aug. 17, 1999

[54] FULL-TEXT INDEX PRODUCING DEVICE FOR PRODUCING A FULL-TEXT INDEX AND FULL-TEXT DATA BASE RETRIEVING DEVICE HAVING THE FULL-TEXT INDEX

[75] Inventor: Toshikazu Fukushima, Tokyo, Japan

[73] Assignee: NEC Corporation, Tokyo, Japan

[21] Appl. No.: 08/845,038

[22] Filed: Apr. 21, 1997

[30] Foreign Application Priority Data

Apr. 19, 1996 [JP] Japan .................................. 8-098050

[51] Int. Cl.[6] .................................................. G06F 17/30
[52] U.S. Cl. ............................ 707/104; 707/101; 707/21
[58] Field of Search .................................... 707/100, 101, 707/1, 2, 21, 104

[56] References Cited

U.S. PATENT DOCUMENTS

| | | | |
|---|---|---|---|
| 4,985,863 | 1/1991 | Fujisawa et al. ............................ | 707/5 |
| 5,265,242 | 11/1993 | Fujisawa et al. ............................ | 707/3 |
| 5,717,922 | 2/1998 | Hohensee et al. ....................... | 707/100 |
| 5,819,288 | 10/1998 | DeBonet ................................. | 707/104 |
| 5,873,056 | 2/1999 | Liddy et al. ................................ | 704/9 |

Primary Examiner—Thomas G. Black
Assistant Examiner—Charles L. Rones
Attorney, Agent, or Firm—Sughrue, Mion, Zinn, Macpeak & Seas,PLLC

[57] ABSTRACT

A full-text data base retrieving device retrieves a data base in accordance with a query. A full-text index has character location information representative of location of each of key character sequences of N characters that appear in the data base, where N is a positive integer. A query memory memorizes the query as a retrieval key character sequence. A separating section separates the retrieval key character sequence into a plurality of retrieval key character sequences of N characters to extract contexts as extracted contexts from the retrieval key character sequence in accordance with the retrieval key character sequences. A context classifying section classifies the extracted contexts into classified contexts having the classification numbers, respectively. An index retrieving section retrieves the full-text index in accordance with the sorts of the retrieval key character sequences and the classified contexts to read the character location information as a retrieval result out of the full-text index. A detecting section detects appearance locations of the retrieval key character sequence in the full-text data base to produce the appearance locations as a detected result.

5 Claims, 7 Drawing Sheets

| | 500 | 501 | 502 |
|---|---|---|---|
| | | (0, 0) | 3-3, 3-4 |
| | | (0, 2) | 2-1 |
| | あ | (2, 0) | 1-6 |
| | | (2, 4) | 1-3 |
| | | (4, 0) | 3-2 |
| | い | (0, 4) | 2-2 |
| | | (4, 0) | 1-2, 1-5 |
| | | (0, 0) | 3-1 |
| | う | (0, 2) | 1-1, 1-4 |
| | | (2, 0) | 2-3 |

日本 * ( アメリカ + 米国 + USA )

FULL-TEXT INDEX PRODUCING DEVICE FOR PRODUCING A FULL-TEXT INDEX AND FULL-TEXT DATA BASE RETRIEVING DEVICE HAVING THE FULL-TEXT INDEX

BACKGROUND OF THE INVENTION

This invention relates to a full-text data base retrieving device for memorizing a plurality of texts (character code sequences) as a full-text data base to retrieve a text from the full-text data base on the basis of a retrieving condition such as key words, and relates to a full-text index producing device for producing a complementary file (full-text index) which is used in retrieval.

In order to retrieve a text from a full-text data base at a high speed, a complementary file (full-text index) is produced in concern with the full-text data base to be referred on retrieving the text from the full-text data base. In general, the full-text index has any one of first though fifth types. The full-text indexes of the first through the fifth types may be called first through fifth type indexes, respectively.

A single word is used as a key in the the first type index. A character sequence having a predetermined length is used as the key in the second type index. The character sequence having a same character sort is used as the key in the third type index. The single word and the character sequence are used as the key in the fourth type index. The single word and the character sequence are used as the key in the fifth type index. A full-text index file may have a combination of any one of the first through the third type indexes and any one of the fourth and the fifth type indexes.

In a text retrieval of English text, use is often made of a full-text index file having the first and the fourth type indexes or the first and the fifth type indexes. The full-text index file of the type described will be called a first full-text index file. Each word is punctuated with a space in English text. On the other hand, it is necessary to divide a solid writing text into each word with reference to a word dictionary in order to produce the first full-text index file in a text retrieval of Japanese text. This process will be called a morphological analysis. A full-text data base retrieving device having the first full-text index file will be called a first full-text data base retrieving device. In the first full-text data base retrieving device, a word which is at least partially coincident with a key word is retrieved from a key group of the first full-text index file when the key word is given as a query. When a coincident key (word) exists in the first full-text index file, the full-text data base retrieving device reads the text ID or the location in the text as a retrieval result from the first full-text index file.

A full-text index file having the second and the fourth type indexes will be called a second full-text index file. A full-text data base retrieving device having the second full-text index file will be called a second full-text data base retrieving device. In the second full-text data base retrieving device, a character sequence of a key word is divided when the key word is given as a query. It will be assumed that the key word is "東京都" and that the predetermined length is equal to one. The second full-text data base retrieving device divides "東京都" into "東", "京", and "都" each of which is a key character. The second full-text data base retrieving device retrieves the second full-text index file on the basis of the each key character to obtain a set of texts each of which has "東", a set of texts each of which has "京", and a set of texts each of which has "都". On the basis of these sets, the second full-text data base retrieving device obtains a set of texts each of which has "東", "京", and "都".

It will be assumed that the key word is "東京都" and that the predetermined length is equal to two. The second full-text data base retrieving device divides "東京都" into "東京" and "京都" each of which is a key character. The second full-text data base retrieving device retrieves the second full-text index file on the basis of the each key character to obtain a set of texts each of which has "東京" and a set of texts each of which has "京都". On the basis of these sets, the second full-text data base retrieving device obtains a set of texts each of which has "東京" and "京都". The set of texts may includes a rubbish. More specifically, three characters may not be arranged in order of "東京都" even if three characters of "東", "京", and "都" are included in a text. For example, the text including the character sequence of "...東京と京都は...." becomes the rubbish. In order to remove the rubbish, it is necessary to carry out character string watching between the text and the key word in concern to the text of the retrieval result.

A full-text index file having the second and the fifth type indexes will be called a third full-text index file. A full-text data base retrieving device having the third full-text index file will be called a third full-text data base retrieving device. In the third full-text data base retrieving device, a character sequence of a key word is divided when the key word is given as a query. It will be assumed that the key word is "東京都" and that the predetermined length is equal to one. The third full-text data base retrieving device divides "東京都" into "東", "京", and "都" each of which is a key character. The third full-text data base retrieving device retrieves the third full-text index file on the basis of the each key character to obtain a set of text ID and location in the text which has "東", a set of text ID and location in the text which has "京", and a set of text ID and location in the text which has "都". The third full data base retrieving device combines the elements of these sets to obtain a location at which three characters of "東", "京", and "都" appears as a character sequence of "東京都" in a same text.

It will be assumed that the key word is "東京都" and that the predetermined length is equal to two. The third full-text data base retrieving device divides "東京都" into "東京" and "京都" each of which is a key character. The third full-text data base retrieving device judges the location at which the character sequence of "東京都" as a similar manner described above. The rubbish does not occur in the third full-text data base retrieving device.

A full-text index file having the third and the fourth type indexes will be called a fourth full-text index file. The fourth full-text index file uses, as a key character sequence, a character sequence obtained by dividing a text by a same sort of characters such as Chinese character, Japanese cursive syllabary, and square Japanese syllabary. A full-text data base retrieving device having the fourth full-text index file will be called a fourth full-text data base retrieving device.

It will be assumed that the text is "フルテキスト検索システムを開発した". Each of "フルテキスト", "検索", "システム", "を", "開発", and "した" becomes the key character sequence. The key word of the query is divided in a similar manner described above. The fourth full-text text data base retrieving device retrieves the fourth index file on the basis of the key word. For example, the key word is divided into "テキスト" and "検索" when the key word is "テキスト検索". The fourth full-text data base retrieving device retrieves the fourth index file to obtain a text including "テキスト" and "検索".

A full-text index file having the third and the fifth type indexes may be called a fifth full-text index file. A full-text data base retrieving device having the fifth full-text index file will be called a fifth full-text data base retrieving device. The fifth full-text data base retrieving device is operable in a manner similar to the fourth full-text data base retrieving device.

By the way, the first full-text data base retrieving device must use the above-mentioned morphological analysis on producing the first full-text index file in case of Japanese text. In this analysis, it is necessary to divide each text into words with reference to a word dictionary having a hundred thousand through a several hundred thousand words. Therefore, it takes a long time to produce the first full-text index file. Furthermore, it is a case that some texts have a word which is not included in the word dictionary. As a result, it is difficult to analyze all of texts with a high accuracy. Namely, it is difficult for the first full-text index file to have a high accuracy.

As described above, the retrieval results may include the rubbish in the second full-text data base retrieving device. Similarly, the retrieval results may include the rubbish in the fourth full-text data base retrieving device as known in the art. In order to remove the rubbish, it is necessary to carry out character string watching between the text and the key word in concern to the text of the retrieval result. As a result, It is difficult to carry out the retrieval at a high speed in each of the second and the fourth full-text data base retrieving devices.

On the other hand, it is possible to produce each of the third and the fifth full-text index files at a short time. The rubbish does not occurs in each of the third and the fifth full-text data base retrieving devices on retrieval.

However, it is difficult to carry out a retrieval at a high speed with the full-text index file having a small capacity in any one of the third and the fourth full-text data base retrieving device as will be describe later.

SUMMARY OF THE INVENTION

It is an object of this invention to provide a full-text index producing device capable of producing a full-text index file having a small capacity.

It is another object of this invention to provide a full-text data base retrieving device capable of carrying out a retrieval at a high speed with making the full-text index file have the small capacity.

Other objects of this invention will become clear as the description proceeds.

According to an aspect of this invention, there is provided a full-text index producing device for producing a full-text index. The full-text index producing device comprises extracting means for extracting character sets of N characters as extracted sets, contexts having any one of the extracted sets, and character location information representative of location of each of the extracted sets from a full-text data base, where N is a positive integer, context classifying means for classifying the contexts into classified contexts having classification numbers, respectively, and producing means for producing the character location information in accordance with the sorts of the extracted sets and the classified contexts to produce the full-text index.

According to another aspect of this invention, there is provided a full-text data base retrieving device for retrieving a data base on the basis of a query. The full-text data base retrieving device comprises a full-text index having character location information representative of location of each of character sets of N characters that appear in said data base, where N is a positive integer, the character location information being produced in accordance with the sorts of said character sets and classified contexts which have classification numbers and each of which has any one of the character sets, query memory means for memorizing an inputted query as a retrieval character sequence, separating means for separating said retrieval character sequence into a plurality of retrieval character sets of N characters to extract contexts as extracted contexts from the retrieval character sequence in accordance with the retrieval character sets, context classifying means for classifying the extracted contexts into classified contexts having classification numbers, respectively, index retrieving means for retrieving the full-text index in accordance with the sorts of the retrieval character sets and the classified contexts to read the character location information as a retrieval result out of the full-text index, and detecting means for detecting appearance locations of the retrieval character sequence in the full-text data base to produce the appearance locations as a detected result.

BRIEF DESCRIPTION OF THE DRAWINGS

FIGS. 5A through 5E are views for describing compression of arrangement of location information;

DESCRIPTION OF THE PREFERRED EMBODIMENT

Figure 1A:
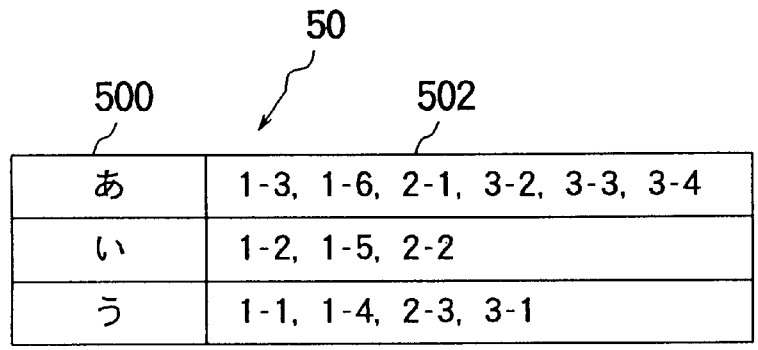
FIGS. 1A and 1B show a view for describing a conventional full-text index (prior art)
Figure 1B:
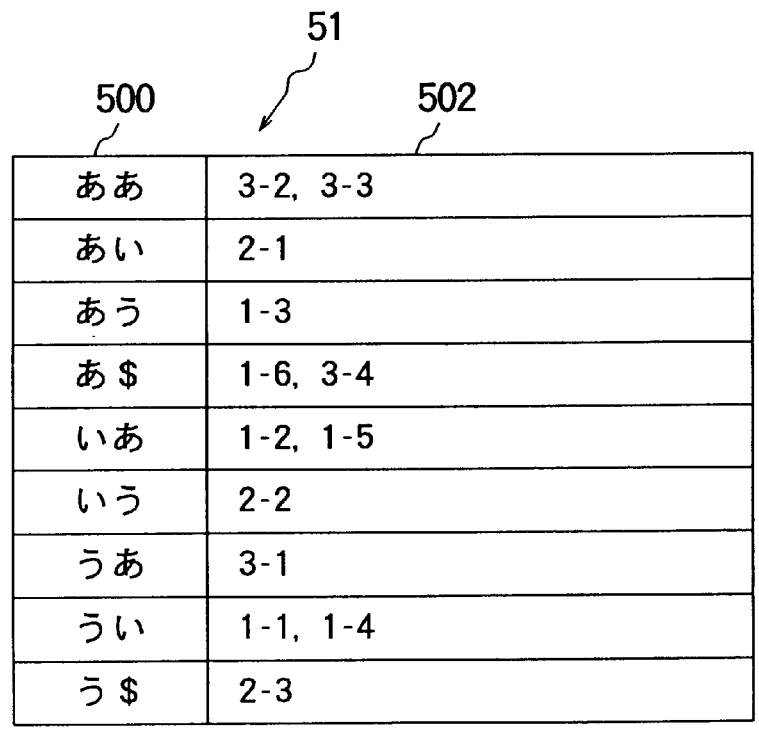

Referring to FIGS. 1A and 1B, a conventional full-text index file will be described at first in order to facilitate an understanding of this invention. The fifth full-text index file described in the prior art will be used as the conventional full-text index file.

Figures 3A, 3B:
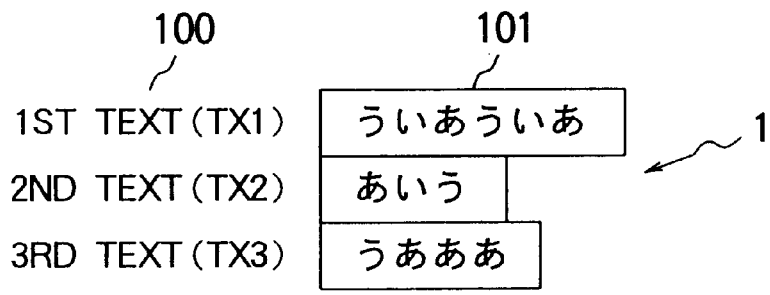
FIGS. 3A and 3B show a view for illustrating a full-text data base and a full-text index produced by the full-text index producing device illustrated in FIG. 2.

The conventional full-text index file may have a first full-text index 50 illustrated in FIG. 1A. The first full-text index 50 has a key character sequence length of one. The first full-text index 50 is produced on the basis of a full-text data base 1 which is illustrated in FIG. 3A and which will be later described. The first full-text index 50 has a key character sequence area for the key character sequence 500 and a location information area for location information 502. The location information 502 has a form of (n–m). n is representative of an n-th text, where n is a positive integer which is not less than one. m is representative of a m-th character, where m is a positive integer which is not less than one. More particularly, the character "い" appears at the second and the fifth character of the first text and the second character of the second text as shown in FIG. 1A.

On retrieving a key word of "あうい" with reference to the first conventional full-text index 50 illustrated in FIG. 1A, a conventional retrieving device (not shown) retrieves the first full-text index 50 in concern to each character of the key word "あうい" to read the location information of each character out of the first full-text index 50. The location information is given by:

あ→1-3, 1-6, 2-1, 3-2, 3-3, 3-4,
う→1-1, 1-4, 2-3, 3-1,
い→1-2, 1-5, 2-2.

The conventional retrieving device investigates a location relationship of each character on the basis of the location information to judge whether or not an arrangement of "あうい" exists. In the example being illustrated, the arrangement of "あうい" is satisfied by "あ:1-3", "い:1-4", and "う:1-5". Therefore, the key word "あうい" exists in the third through the fifth characters of the first text.

On carrying out a retrieval with reference to the first full-text index 50 illustrated in FIG. 1A, a retrieval speed is affected by the read out amount of the location information when the scale of the full-text data base becomes great. More particularly, it will be assumed that it takes a first time duration to retrieve the characters of "あ", "う" and "い" from the key character sequence area. In addition, it will be assumed that it takes a second time duration to read "1-3, 1-6, 2-1, 3-2, 3-3, 3-4" for "あ", "1-1, 1-4, 2-3, 3-1" for "う", and "1-2, 1-5, 2-2" for "い" out of the location information area. The second time duration is far longer than the first time duration. Although it is sufficient that the key character sequence area has a size of characters of several thousands, the location information area linearly increases as the scale of the full-text data base becomes great.

A whole capacity of the location information area is obtained by multiplying all characters Q of whole texts and a size P of each location information (n–m). When the number of character sorts in the whole texts is given by C and the length of the key word is given by L, the read out amount of the location information is given in average by $Q \times P \times L/C$ on carrying out the retrieval. When Q=1G(ten hundred millions) characters, P=4 bytes, C=3000 characters, and L=3 characters, $Q \times P \times L/C$=4M(four millions) bytes. In a retrieval of one key word, the retrieval speed is greatly reduced if read out operation is carried out in the data of 4M bytes.

The conventional full-text index file may have a second full-text index 51 illustrated in FIG. 1B. The second full-text index 51 has a key character sequence length of two. The second full-text index 51 is produced on the basis of a full-text data base 1 which is illustrated in FIG. 3A. For example, the set of two characters "ああ" appears in the second and the third characters of the third text in FIG. 1B. In the FIG. 1B, "$" is representative of a dummy symbol of a text end.

On retrieving a key word of "あうい" with reference to the second full-text index 51 illustrated in FIG. 1B, the conventional retrieving device divides the key word "あうい" into a set of two characters such as "あう" and "うい". The conventional retrieving device may divide the key word it "あうい" into "あう" and "い*", where * is representative of an optional character. Alternatively, the conventional retrieving device may divide the key word "あうい" into "*あ" and "うい". The conventional retrieving device retrieves the second full-text index 51 in concern to each of the character sets to read the location information of each character set out of the second full-text index 51. The location information is given by:

あう→1-3,
うい→1-1, 1-4.

The conventional retrieving device investigates a location relationship of each character set on the basis of the location information to judge whether or not an arrangement of "あうい" exists. In the example being illustrated, the arrangement of "あうい" is satisfied by "あう:1-3" and "うい:1-4". Therefore, the key word "あうい" exists in the third through the fifth characters of the first text.

When the second full-text index 51 is compared with the first full-text index 50, the size of the location information area is given by Q×P in both of the first and the second full-text indexes 50 and 51 if the location information area has a variable length in concern to the each key character sequence. However, the sorts of the key character sequences in the second full-text index 51 are far greater than those in the first full-text index 50. More particularly, the sorts of the key character sequences becomes C×C ways in maximum in the second full-text index 51 when the sorts of the key character sequences is C ways in maximum in the first full-text index 50. As a result, it is possible to greatly decrease the amount of the data which should be read in concern to one key character sequence in the second full-text index 51 in comparison with the first full-text index 50. Inasmuch as the sorts of the key character sequences in the second full-text index 51 is greater than those in the first full-text index 50, it takes a large time to retrieve the key character sequences in the second full-text index 51. On retrieving the key character sequence area, the retrieval time increases with a logarithmic order in concern to the sorts of the key character sequences. Otherwise, the read out amount of the location information linearly decreases in concern to the sorts of the key character sequences. Therefore, it is possible to carry out the retrieval at a high speed in the second full-text index 51 in comparison with the first full-text index 50.

However, the key character area has a large capacity in the second full-text index 51 in comparison with the first full-text index 50. Therefore, a large trade-off occurs between the capacity of the index file and the retrieval speed in the second full-text index 51. Although the retrieval speed becomes a more high speed when the length of the key character sequence become longer, the capacity of the index file greatly increases when the length of the key character sequence increases with the length of only one.

Figure 2:
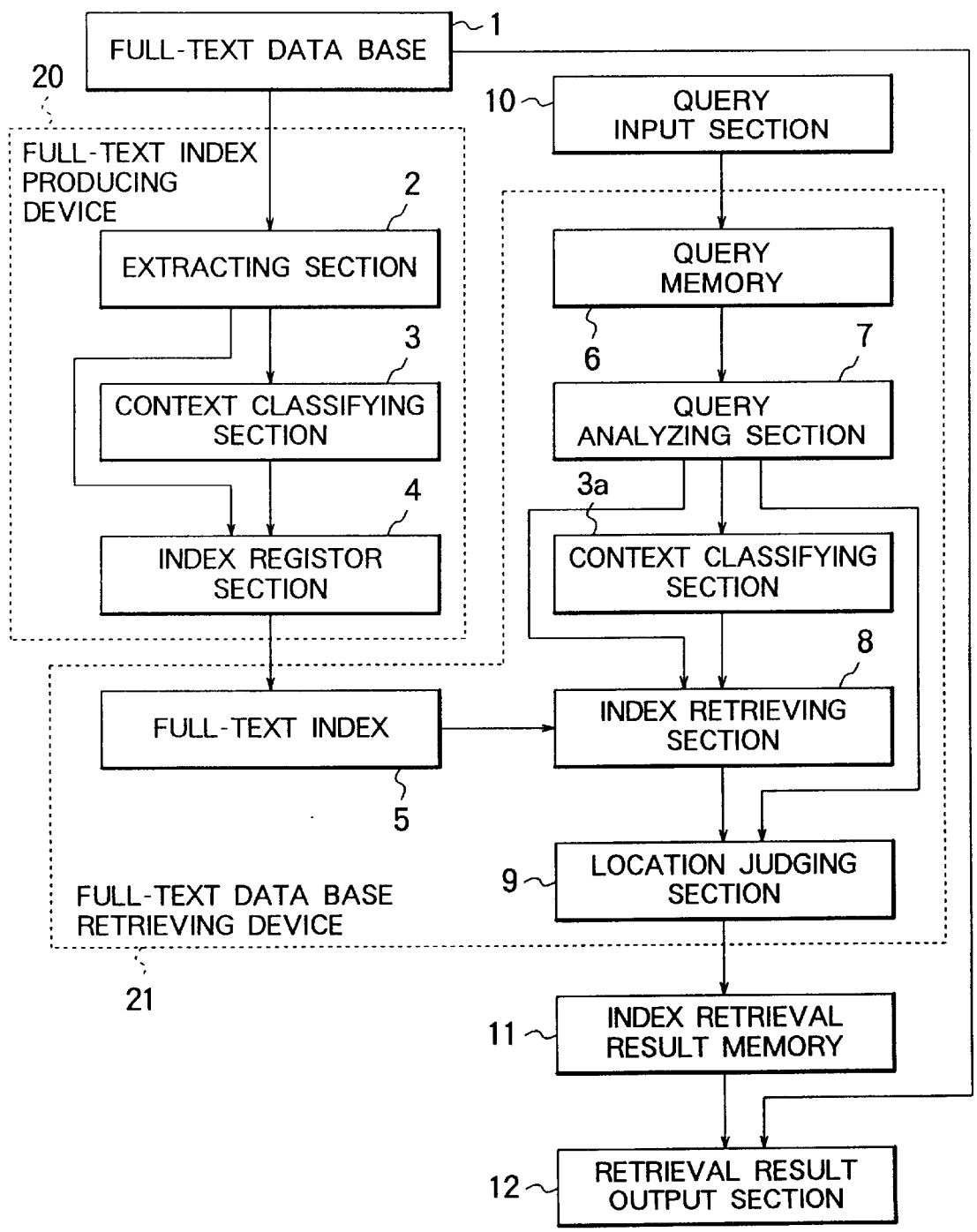
FIG. 2 is a block diagram of a full-text index producing device and a full-text data base retrieving device according to a preferred embodiment of this invention (prior art)

Referring to FIG. 2, description will proceed to a full-text index producing device according to a preferred embodiment of this invention. The illustrated full-text index producing device 20 comprises an extracting section 2, a context classifying section 3, and an index register section 4. The full-text index producing device 20 is connected to a full-text data base 1.

Referring to FIGS. 3A and 3B in addition to FIG. 2, the full-text data base 1 is a set of electric texts (character code sequences). As shown in FIG. 3A, the full-text data base 1 has a text ID area and a text body area. The text ID area is for memorizing a plurality of text ID's 100. The text body area is for memorizing a plurality of text bodies 101 in correspondence to the text ID's, respectively. In the example being illustrated in FIG. 3A, TX1, TX2, and TX3 are memorized as the text ID's 100 in the text ID area. In correspondence to the TX1, the TX2, and the TX3, "ういあういあ", "あいう", and "うあああ" are memorized as the text bodies 101 in the text body area. In general, the data base 1 is memorized in a memory device such as a magnetic disc device or an optical disc device.

Figure 4:
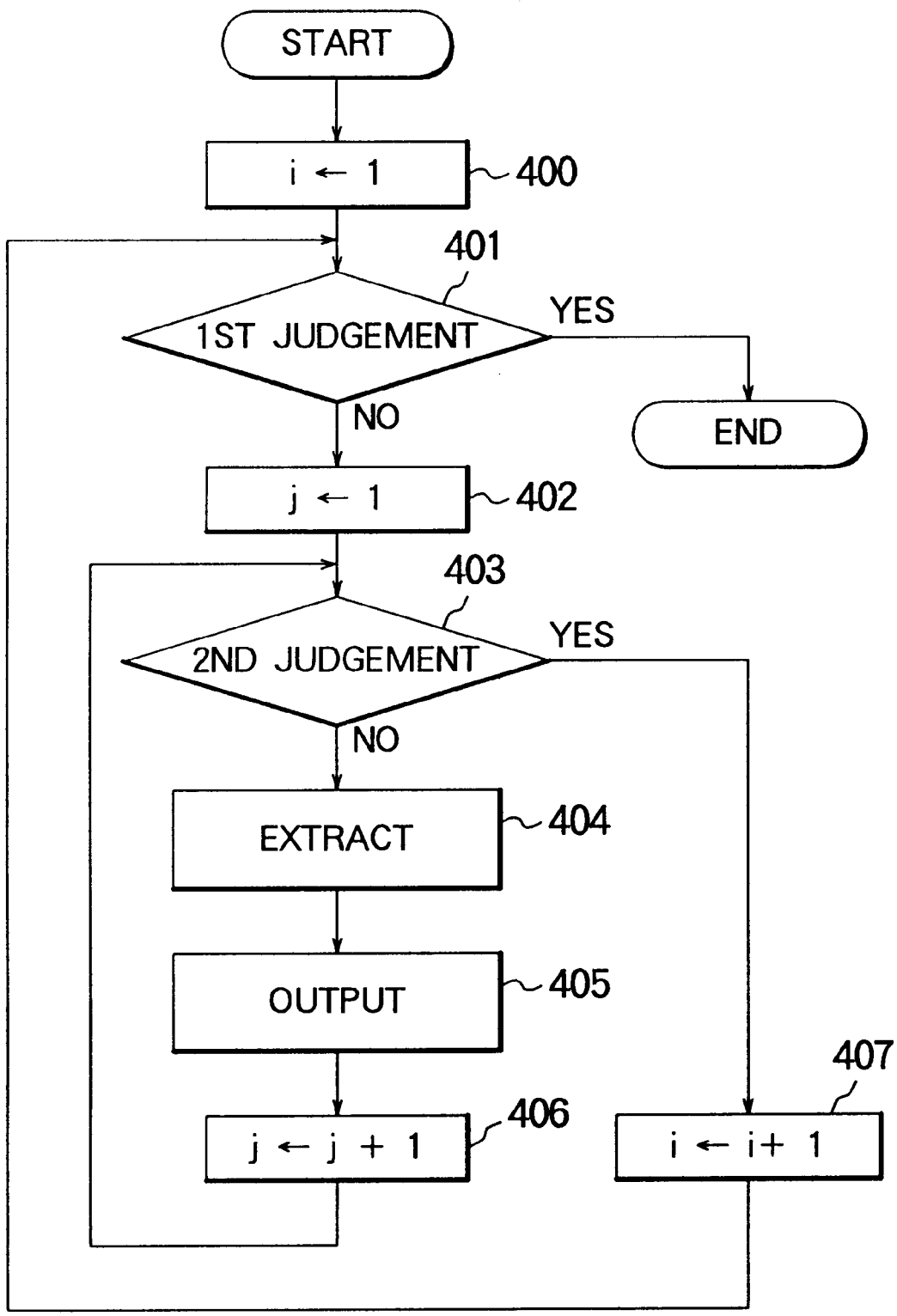
FIG. 4 is a flow chart for describing operation of the extracting section illustrated in FIG. 2.

Referring to FIG. 4 together with FIG. 2, the extracting section 2 extracts a character set of N characters as an extracted set from the full-text data base 1, where N is a positive integer. The extracting section 2 extracts the context having the extracted set from the data base 1. From the full-text data base 1, the extracting section 2 extracts character location information representative of location of extracted set in each text. More particularly, the extracting section 2 set a positive integer i=1 at an initial state in a first step 400 as shown in FIG. 4, where the positive i represents an i-th text ID. The extracting section 2 judges whether or not the positive integer i is greater than a sum of texts in the full-text data base 1 in a second step 401 labelled "1st JUDGEMENT" as shown in FIG. 4. When the positive integer i is not greater than the sum of the texts, the extracting section 2 set a positive integer J=1 at a third step 402 as shown in FIG. 4, where the positive integer j represents a j-th character in the i-th text. The extracting section 2 judges whether or not the positive integer j is greater than a sum of the characters in the i-th text in a fourth step 403 labelled "2nd JUDGEMENT" as shown in FIG. 4. When the positive integer j is not greater than the sum of the characters in the i-th text, the extracting section 2 extracts the character set of N characters as the extracted set from the j-th character of the i-th text and extracts the context having the extracted set in a fifth step 404 labelled "EXTRACT" as shown in FIGS. 4. The context is given by, for example, S characters just before the extracted set and T characters just after the extracted set. The extracting section 2 produces character location information given by (i–j), where (i–j) represents the j-th character of the i-th text. The extracting section 2 outputs the extracted set, the context, and the character location information in a sixth step 405 labelled "OUTPUT" as shown in FIG. 4. The sixth step 405 is followed by a seventh step 406 at which j=j+1. The seventh step 406 is returned back to the fourth step 403.

When the positive integer j is not greater than the sum of the characters in the i-th text at the fourth step 403, the fourth step 403 is followed by an eighth step 407 at which i=i+1. The seventh step 407 is returned back to the second step 401. When the positive integer i is greater than the sum of the texts in the second step 401, operation is an end.

Referring to FIG. 2, the context classifying section 3 classifies the context having the extracted set into classified context having a classification number. More specifically, it will be assumed that the S characters will be called a front context and that the T characters of T will be called a back context. The context classifying section 3 adds character codes of the front context to obtain a front sum. The context classifying section 3 divides the front sum by a predetermined upper limit value R to produce a remainder which is used as the classification number. Alternatively, the context classifying section 3 adds character codes of the back context to obtain a back sum. The context classifying section 3 divides the back sum by the predetermined upper limit value R to produce a remainder which is used as the classification number.

Furthermore, the context classifying section 3 may partially extracts a bit sequence from the front or the back context until the bit sequence has logR bits. In this case, the bit sequence is used as the classification number.

In addition, the predetermined upper limit value R is generally determined as a constant which is common to all extracted sets. The predetermined upper limit value R may be determined on the basis of a sort of the extracted set. In this case, it is possible to easily adjust the capacity of the index file and the retrieval speed. For example, the predetermined upper limit value R may be determined in accordance with Chinese character, Japanese cursive syllabary, and square Japanese syllabary. The predetermined upper limit value R may be determined in each extracted set on the basis of an appearance frequency of each extracted set in the full-text data base 1. Furthermore, a different upper limit value may be determined in correspondence to the front context and the back context.

The index register section 4 is for classifying the character location information of each extracted set into classified character location information on the basis of the sort of the extracted set and the classification of the context to register the classified character location information to a full-text index 5. FIG. 3B shows an example of a full-text index 5 produced by the index register section 4.

Referring to FIG. 3B, the full-text index 5 comprises a key character sequence area having a plurality of key character sequences (extracted sets) 500, a context classification area having a plurality of context classifications 501, and a location information area having a plurality of location information 502. Each of key character sequences 500, the context classifications 501, and the location information 502 are concerned to one another. A retrieval key word for the full-text index 5 is classified in accordance with the key character sequences and is further classified on the basis of the context classifications to reach to one of the location information. B-tree algorithm or Binary tree algorithm is used as a register-retrieval algorithm for the full-text index 5.

Turn back to FIG. 2, the index register section 4 may compress the location information in order to decrease the capacity of the location information area. More particularly, the index register section 4 calculates a difference value between a present location information and a previous location information to separate the difference value by e bits and to produce first through K-th separated value in an ascending order, where K represents a positive integer which is not less than one. The index register section 4 judges whether or not all bits of a k-th separated value are zero, where k is a variable between one and K. When all bits of first separated value are zero, the index register section 4 abandons the first separated value. In case where the all bits of first separated value are zero, the index register section 4 abandons the second separated value when all of the second separated value are zero. In case where all of bits of the first through (k–1)-th separated values are zero, the index register section 4 abandons the k-th separated value when all of the k-th separated value are zero.

It will be assumed that first through (k–1)-th separated values are abandoned by the index register section 4. The index register section 4 adds each of the k-th through the K-th separated values to a flag bit to produce k-th through K-th effective values each of which has (e+1) bits. The k-th through the K-th effective values are registered as a compressed location information to the full-text index 5.

Again referring to FIG. 2, it will be assumed that N=1, S=1, and T=1. When the extracting section 2 is operated in this condition to the full-text data base 1 illustrated in FIG. 3A, a following result are obtained.

Character set of N characters, front context, back context, character location information]=[う, $,い, 1-1], [い,う,あ, 1-2], [あ,い,う, 1-3], [う,あ,い, 1-4], [い,う,あ, 1-5], [あ,い,$, 1-6], [あ, $,い, 2-1], . . . where "$" represents a dummy symbol of a head or an end of a text.

In addition, it will be assumed that N=2, S=1, and T=2. When the extracting section 2 is operated in this condition to the full-text data base 1 illustrated in FIG. 3A, a following result are obtained.

Character set of N characters, front context, back context, character location information]=[うい, $,あう, 1-1], [いあ,う,うい, 1-2], [あう,い,いあ, 1-3], [うい,あ,あ$, 1-4], [いあ,う, $$, 1-5], [あ$,い, $$, 1-6, [あい,$,う$, 2-1], . . .

It will be assumed that the length of character sequence of the context is one (each of S and T−1) and R=1. The context classifying section 3 produces a following result.

"あ" (JIS code is 2422 in hexadecimal notation)= classification number:0

"い" (JIS code is 2424 in hexadecimal notation)= classification number:2

"う" (JIS code is 2426 in hexadecimal notation)= classification number:4

In case where the context represents "$" (the context does not exist in the head or the end of the text), an optional classification number may be labelled to the context having "$". More particularly, the classification number "0" is assigned to the context having "$". Alternatively, a specific classification number(for example "−10") is assigned to the context having "$" in order to overlap other classification numbers. In addition, classification numbers may be regularly or randomly assigned to the contexts, respectively.

It will be assumed that the extracting section 2 is operated at conditions of N=1, S=1, and T=1. Furthermore, it will be assumed that context classifying section 3 is operated at conditions of S=1, T=1, and R=5. The index register section 4 is supplied with following data.

[set of N characters, (front context, back context), character location information]=[う, (0, 2), 1-1], [い, (4, 0), 1-2], [あ, (2, 4), 1-3], [う, (0, 2), 1-4], [い, (4, 0), 1-5], [あ, (2, 0), 1-6], [あ, (0, 2), 2-1], . . .

As described above, the upper limit value R may individually determined in accordance with the sort of the extracted set although the upper limit value R is equal to five in all of the extracted sets in the above-mentioned description. For example, the upper limit value R is determined to two when N is equal to one and when the extracted set is Chinese character. The upper limit value R is determined to five when N is equal to one and when the extracted set is Japanese cursive syllabary. The upper limit value R is determined to four when N is equal to one and when the extracted set is square Japanese syllabary. The upper limit value R becomes great in the character sort having an appearance frequency. As a result, it is possible to separate the location information in detail and to effectively increase the retrieval speed.

Referring to FIGS. 5A through 5E, the index register section 4 may compress the the location information in to a compressed location information as described above on registering the location information to the full-text index 5. The location information 502 are separated in accordance with the key character sequences 500 and the context classifications 501 to be sorted in the ascending order. The location information 502 is represented by hexadecimal values in FIGS. 5A through 5E.

FIG. 5A shows the arrangement of the location information of seven events each of which has four bytes. In FIG. 5B, the difference value 503 is calculated between the location information and the just previous location information. In FIG. 5C, the difference value 503 is separated by the e bits to be processed into the first through K-th separated values 504 in the ascending order. In the example being illustrated, e is equal to seven. In case where all of bits of the first through the (k−1)-th separated values are zero or NULL, the k-th separated value is abandoned when the all of bits of the k-th separated value are zero or NULL in order to produce a state 505 illustrated in FIG. 5D.

It will be assumed that first through the (k−1)-th separated values are abandoned. The k-th through K-th separated values are arranged in the ascending order. The flag bit is added to each of the k-th through K-th separated values in order to produce the compressed location information 506 illustrated in FIG. 5E. In the example being illustrated, one is used as the flag bit. By a manner described above, the compressed location information has the capacity of 10 bytes as shown in FIG. 5E although the location information has the capacity of 4×7=28 bytes in FIG. 5A.

Again referring to FIG. 2, description will proceed to a full-text data base retrieving device according to a preferred embodiment of this invention. The illustrated full-text data base retrieving device comprises the full-text index 5, a query memory 6, a query analyzing section 7, a context classifying section 3a, an index retrieving section 8, and a location judging section 9.

As described above, the full-text index 5 is produced by the full-text index producing device 20. In general, the full-text index 5 is memorized in a memory device such as a magnetic disc device or a an optical disc device in a manner similar to the data base 1.

Figures 6A, 6B:
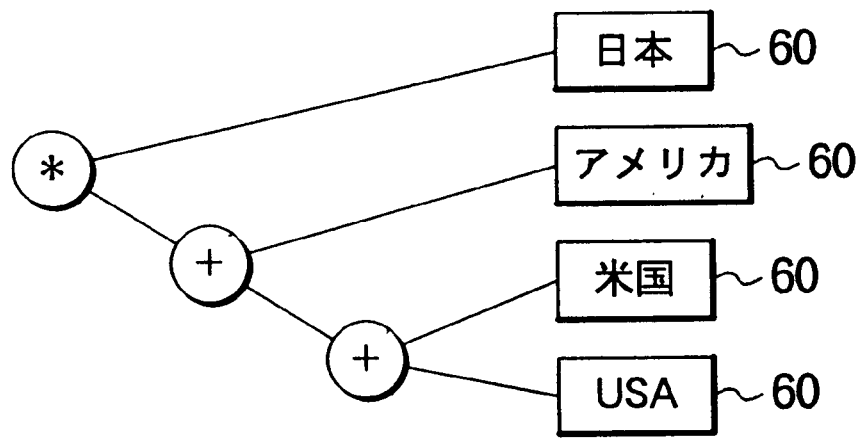
FIGS. 6A and 6B show a view for illustrating a form of a query.

The query memory 6 is for memorizing a query which is inputted from a query input section 10 such as a keyboard. A semiconductor memory or a magnetic disc device may be used as the query memory 6. The key word is generally used as the query. When a user inputs the key word from the query input section 10 to the full-text data base retrieving device 21, the full-text data base retrieving device 21 is supplied with a command representative of retrieving the character sequence in accordance with the key word. A single key word may be used as the query. Alternatively, a combination of a plurality of key words may be used as the query. The query may include a logical expression concerned to the combination of the key words 60. The query memory 6 memorizes the query in a form illustrated in FIG. 6A. FIG. 6A shows the character sequences of the query which is inputted from the user illustrated in FIG. 6A. In FIG. 6A, "*" is representative of logical multiplication. "+" is representative of logical sum. A range of parenthesis is calculated prior to other ranges. The query memory 6 may memorize the query in a form illustrated in FIG. 6B. In FIG. 6B, the query is converted into a tree structure having the key words 60 in order to easily carry out process in a computer.

The query analyzing section 7 carries out an analyzing process. More particularly, the query analyzing section 7 separates a key word character sequence into character sets each of which has N characters. The query analyzing section 7 further produces a context of each character set in the key word character sequence.

In case where the query has the logical expression of the key words, the analyzing process is carried out in concern to each key word. More specifically, it will be assumed that the query memory 6 memorizes the query illustrated in FIG. 6B. The query condition analyzing section 7 separates the key word character sequence into character sets in concern to the key word of each key word or leaf 60 in the tree structure. The query analyzing section 7 further produces the context of each character set. As a result, a data structure is obtained which has the character sets and the contexts in concern to each leaf 60 of the tree structure illustrated in FIG. 6B.

A first or a second method may be used on separating the key word character sequence into the character sets. In the first method, the query analyzing section 7 carries out a process similar to the process of the extracting section 2. The query analyzing section 7 carries out a shift of a character to separate the key word character sequence into the character sets. In the second method, the query analyzing section 7 carries out a shift of N characters with no overlap to separate the key word character sequence into the character sets. At any rate, the query analyzing section 7 operates in a manner similar to the extracting section 3. The query analyzing section 7 uses the length N of the key word character sequence, the length S of the front context, and the length T of the back context each of which is equal to the length used on producing the full-text index 5. The query analyzing section 7 outputs the character sets, the contexts (front character and the back character) of character sets, and a shift amount from a head character set.

The context classifying section 3a operates in a manner similar to the context classify section 3 of the full-text index producing device 20. To each context outputted from the query analyzing section 7, the context classifying section 3a assigns a classification number which is not greater than the upper limit value. Although any one of the classification numbers is assigned to the dummy symbol "$" of the head and the end of the text in the full-text index producing device, no classification number is assigned to the head of the key word and the dummy symbol of the head and the end of the key word in the full-text data base retrieving device.

The index retrieving section 8 retrieves the full-text index 5 in accordance with the sorts of the character sets and the classification numbers to read the character location information out of the full-text index 5. In case where the head of the key word or the dummy symbol of the end corresponds to a context of a character set, the index retrieving section 8 deems the dummy symbol as a wild card corresponding to an optional context number to retrieve the full-text index 5.

On compressing the location information, the index retrieving section 8 restores the compressed location information into the location information.

The location judging section 9 judges appearance locations of retrieval character sequences in the full-text data base 1 in the output result of the index retrieving section 8.

Figure 7:
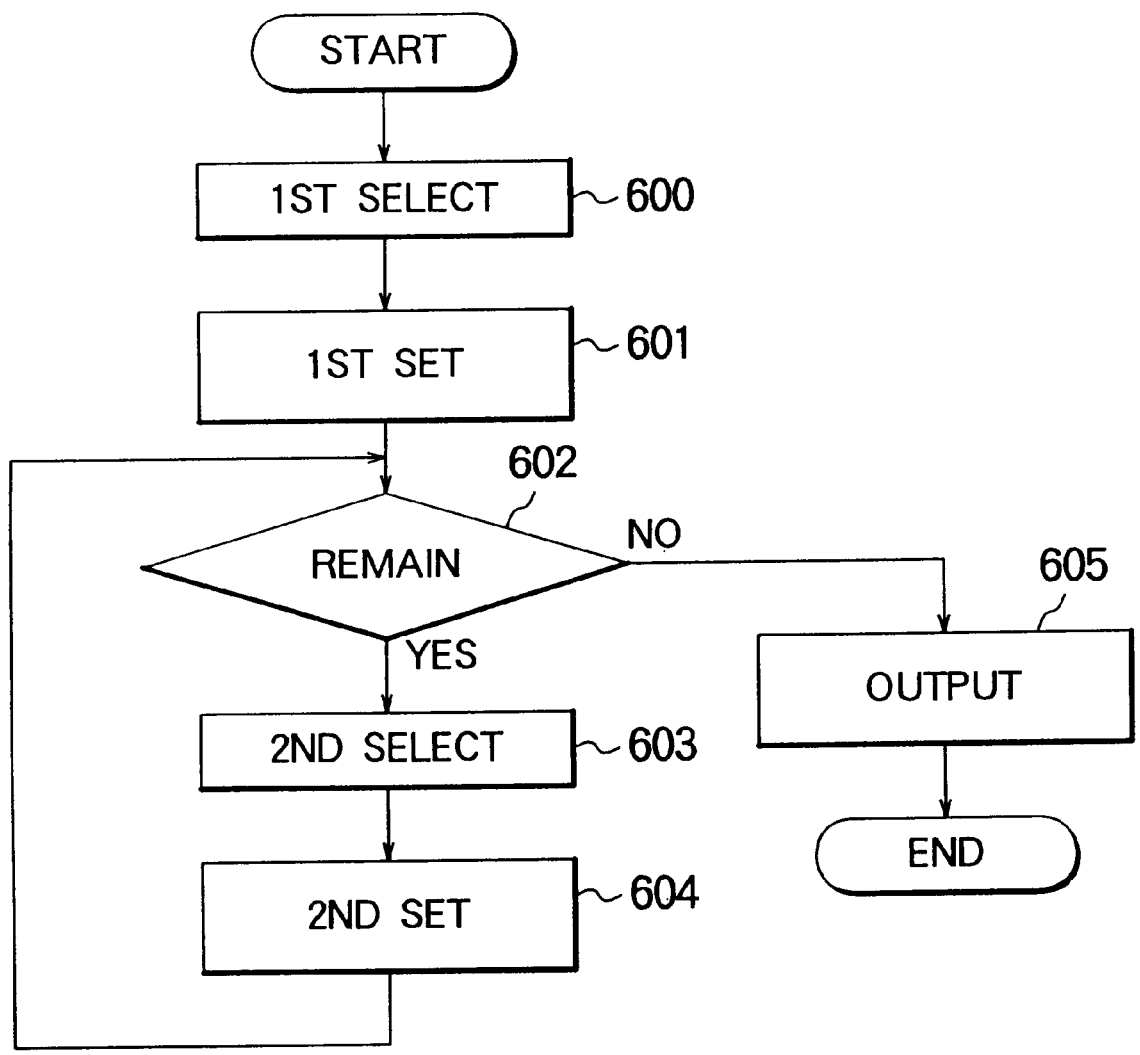
FIG. 7 is a flow chart for describing operation of the location judging section illustrated in FIG. 2.

Referring to FIG. 7, the location judging section 9 selects one of the character sets as a selected set at a first step 600 labelled "1st SELECT" as shown in FIG. 7. When the selected set is shifted at Z characters from the head character set of the key word, the location judging section 9 subtracts the Z characters from each element of character location information set for the selected set to produce a primary character location information set. The location judging section 9 sets the primary character location information set as a hit location set H at a second step 601 labelled "1st SET" as shown in FIG. 7. The location judging section 9 detects whether or not non-processed character set remains as a remaining character set at a third step 602 labelled "REMAIN" as shown in FIG. 7. When the non-processed character set remains as the remaining character set, the location judging section 9 selects the remaining character set as a chosen character set at a fourth step labelled "2nd SELECT" as shown in FIG. 7. When the chosen character set is shifted at characters of Z from the head character set of the key word, the location judging section 9 subtracts the Z characters from each element of character location information set for the chosen character set to produce a subsidiary character location information set. The location judging section 9 multiplies the subsidiary character location information set and the hit location set to produce a renewal hit location set at a fifth step 604 labelled "2nd SET" as shown in FIG. 7. The renewal hit location set is set as the hit location set H. The fifth step 604 is returned back to the third step 602. When the non-processed character set does not remains as the remaining character set, the location judging section 9 outputs elements of the hit location set H as the appearance locations of the key word at a sixth step 605 labelled "OUTPUT" as shown in FIG. 7.

Turning back to FIG. 2, the hit location set H is memorized as an index retrieval result in an index retrieval result memory 11. A retrieval result output section 12 retrieves the full-text data base 1 in accordance with the index retrieval result to output a retrieval result as known in the art.

In case where the query is given by a logical expression, logical calculation is carried out in a text set having each key word in accordance with the logical expression. Inasmuch as it is sufficient that the logical calculation is carried out in a text ID set, it is possible to abandon the location information in the text. In tree structure illustrated in FIG. 6B, it will be assumed that the text ID set is obtained in each key word 60. On obtaining the text ID set satisfying the logical expression, the retrieval operation starts at the leaf 60 illustrated in FIG. 6B to produce the text ID corresponding to each node. Finally, the text ID set is produced which corresponds to a route. In concern to the node of "+", logical sum of the text ID set is produced which corresponds to two nodes or leaves of the lower portion. In concern to the node of "*", logical multiplication the text ID set is produced which corresponds to two nodes or leaves of the lower portion.

Reviewing FIG. 2, it will be assumed that N=1, S–1, T=1, and R=5. When the key word "あうい" is inputted as the query to the full-text data base retrieving device 21, the query analyzing section 7 produces a following analyzed result.

[character set of N characters, front context, back context, shifting amount]=[あ ,$,う, 0], [う ,あ ,い, 1], [い ,う, $, 2]

The context classifying section 3a carries out process of the analyzed result to produce a following classified result.

[character set of N characters, (classification number of front context, classification number of back context), shifting amount]=[あ, (*, 4), 0], [う, (0, 2), 1], [い, (4, *), 2]

where the dummy symbol positioned at the head or the end of the key word is replaced to "*" inasmuch as the dummy symbol is deemed as the wild card in the context classification.

In accordance with the classified result, the index retrieving section 8 retrieves the full-text index 5 illustrated in FIG. 3B. As a result, a following location information are read out of the full-text index 5.

あ: (*, 4)→あ: (2, 4)→1-3

う: (0, 2)→1-1, 1-4

い: (4, *)→い: (4, 0)→1-2, 1-5

The location judging section 9 subtracts the shifting amount from each location information to produce a following calculated result.

あ (shifting amount: 0)→1-3

う (shifting amount: 1)→1-0, 1-3

い (shifting amount: 2)→1-0, 1-3

The location judging section 9 calculates a multiplication of set of the location information. As a result, "1-3" remains. Namely, the key word "あうい" appears at the third character of the first text.

While this invention has thus far been described in conjunction with the preferred embodiment thereof, it will readily be possible for those skilled in the art to put this invention into practice in various other manners.

What is claimed is:

1. A full-text data base retrieving device for retrieving a data base on the basis of a query, said full-text data base retrieving device comprising:

a full-text index having character location information representative of location of each of key character sequences of N characters that appear in said data base, where N is a positive integer, said character location information being produced in accordance with the sorts of said key character sequences and classified contexts which have classification numbers and each of which has any one of said key character sequences;

query memory means for memorizing an inputted query as a retrieval key character sequence;

separating means for separating said retrieval key character sequence into a plurality of retrieval key character sequences of N characters to extract contexts as extracted contexts from said retrieval key character sequence in accordance with said retrieval key character sequences;

context classifying means for classifying said extracted contexts into classified contexts having classification numbers, respectively;

index retrieving means for retrieving said full-text index in accordance with the sorts of said retrieval key character sequences and said classified contexts to read said character location information as a retrieval result out of said full-text index; and detecting means for detecting appearance locations of said retrieval key character sequence in said full-text data base to produce said appearance locations as a detected result.

2. A full-text index producing device as claimed in claim 1, wherein:

a specific one of said retrieval contexts is defined by front characters of S in number that is positioned just before said extracted sets, and back characters of T in number that is positioned just after said extracted sets, where each of S and T represents a positive number; and said context classifying means endowing said specific retrieval context with a specific one of said classification numbers in accordance with character codes of said front characters and said back characters, said specific classification number being defined by a predetermined upper limit value.

3. A full-text index producing device as claimed in claim 2, wherein said predetermined upper limit value is individually determined in accordance with an appearance frequency of each of said extracted sets in said data base.

4. A full-text index producing device as claimed in claim 2, wherein said predetermined upper limit value is determined by the key character sort of each of said extracted sets.

5. A full-text index producing device as claimed in claim 4, wherein said key character sort is any one of Chinese character, Japanese cursive syllabary, and square Japanese syllabary.

* * * * *